(12) United States Patent
Kalkunte et al.

(10) Patent No.: US 7,099,336 B2
(45) Date of Patent: Aug. 29, 2006

(54) METHOD AND APPARATUS FOR FILTERING PACKETS BASED ON FLOWS USING ADDRESS TABLES

(75) Inventors: Mohan Kalkunte, Sunnyvale, CA (US);
Shekhar Ambe, San Jose, CA (US);
Shiri Kadambi, Los Altos Hill, CA (US)

(73) Assignee: Broadcom Corporation, Irvine, CA (US)

( * ) Notice: Subject to any disclaimer, the term of this patent is extended or adjusted under 35 U.S.C. 154(b) by 883 days.

(21) Appl. No.: 09/931,754

(22) Filed: Aug. 20, 2001

(65) Prior Publication Data

US 2002/0051448 A1 May 2, 2002

Related U.S. Application Data

(60) Provisional application No. 60/226,013, filed on Aug. 18, 2000.

(51) Int. Cl.
*H04L 12/56* (2006.01)
(52) U.S. Cl. .................. 370/398; 370/389; 370/401
(58) Field of Classification Search ............... 709/250; 712/26, 27
See application file for complete search history.

(56) References Cited

U.S. PATENT DOCUMENTS

| | | | |
|---|---|---|---|
| 5,761,424 | A | 6/1998 | Adams et al. |
| 5,796,944 | A * | 8/1998 | Hill et al. .................. 709/250 |
| 6,006,318 | A | 12/1999 | Hansen et al. |
| 6,104,696 | A | 8/2000 | Kadambi et al. |
| 6,335,935 | B1 * | 1/2002 | Kadambi et al. ........... 370/396 |
| 6,556,575 | B1 * | 4/2003 | Denio et al. ................. 370/401 |
| 6,625,146 | B1 * | 9/2003 | Merchant et al. ........... 370/389 |
| 6,819,670 | B1 * | 11/2004 | Fenner ........................ 370/392 |

FOREIGN PATENT DOCUMENTS

EP 0537382 A1 10/1991

* cited by examiner

*Primary Examiner*—Chau Nguyen
*Assistant Examiner*—Christopher Grey
(74) *Attorney, Agent, or Firm*—Squire, Sanders & Dempsey, LLP

(57) ABSTRACT

A data switch for network communications includes a first data port interface which supports at least one data port which transmits and receives data. A second data port interface is also provided supporting at least one data port transmitting and receiving data. A CPU interface is provided, with the CPU interface configured to communicate with a CPU. A common memory is provided, and communicates with the first data port interface and the second data port interface. A memory management unit is provided, and communicates data from the first data port interface and the second data port interface and an common memory. A communication channel is provided, with the communication channel communicating data and messaging information between the first data port interface, the second data port interface, and the memory management unit. One data port interface of the first and second data port interfaces has a fast filtering processor for filtering the data coming into the one data port interface, and taking selective filter action based upon a filtering result. Also the one data port interface includes a flow monitor for monitoring flows of data through the network switch, where a flow of data is defined by a combination of a source address and a destination address for a portion of the data passing through the network switch.

15 Claims, 4 Drawing Sheets

METHOD AND APPARATUS FOR FILTERING PACKETS BASED ON FLOWS USING ADDRESS TABLES

REFERENCE TO RELATED APPLICATIONS

This application claims priority of U.S. Provisional Patent Application Ser. No. 60/226,013, filed on Aug. 18, 2000. The contents of the provisional application is hereby incorporated by reference.

BACKGROUND OF THE INVENTION

1. Field of the Invention

The invention relates to an apparatus for high performance switching in local area communications networks such as token ring, ATM, ethernet, fast ethernet, 1 gigabit and 10,000 Mbits/s ethernet environments, generally known as LANs. In particular, the invention relates to a method and switch used to filter packets based on flows of the packets.

2. Description of the Related Art

As computer performance has increased in recent years, the demands on computer networks has significantly increased; faster computer processors and higher memory capabilities need networks with high bandwidth capabilities to enable high speed transfer of significant amounts of data. The well-known ethernet technology, which is based upon numerous IEEE ethernet standards, is one example of computer networking technology which has been able to be modified and improved to remain a viable computing technology. A more complete discussion of prior art networking systems can be found, for example, in SWITCHED AND FAST ETHERNET, by Breyer and Riley (Ziff-Davis, 1996), and numerous IEEE publications relating to IEEE 802 standards. Based upon the Open Systems Interconnect (OSI) 7-layer reference model, network capabilities have grown through the development of repeaters, bridges, routers, and, more recently, "switches", which operate with various types of communication media. Thickwire, thinwire, twisted pair, and optical fiber are examples of media which has been used for computer networks. Switches, as they relate to computer networking and to ethernet, are hardware-based devices which control the flow of data packets or cells based upon destination address information which is available in each packet. A properly designed and implemented switch should be capable of receiving a packet and switching the packet to an appropriate output port at what is referred to wirespeed or linespeed, which is the maximum speed capability of the particular network.

Basic ethernet wirespeed is up to 10 megabits per second, and Fast Ethernet is up to 100 megabits per second. The newest ethernet is referred to as 10,000 Mbits/s ethernet, and is capable of transmitting data over a network at a rate of up to 10,000 megabits per second. As speed has increased, design constraints and design requirements have become more and more complex with respect to following appropriate design and protocol rules and providing a low cost, commercially viable solution. For example, when filtering packets in a switch based on assigned criteria, if the filtering process delays the processing of a packet by the switch, then it becomes almost impossible to operate the switch or the network at linespeed.

One system of filtering packets in a network switch is discussed in U.S. patent application Ser. No. 09/343,411. Such a switch employs a Fast Filtering Processor (FFP) to perform the desired filtering. Filter masks are applied to portions of the incoming packet and a Rule Table is searched for actions to be taken if there is a match with a key found in the Rule Table. The general process of filtering with the FFP is discussed below with respect to the present invention.

However, while the filtering process described above is extremely flexible, it has certain inherent limitations. One of these limitations involves the limits of scalability of the filtering process. In order to track a greater number of flows through the switch, a deeper Rules Table is required. The increased length in the Rules Table increases the cost of the device, as well as potentially preventing sustainable line rate switching. Thus, there is a need to provide proper filtering of switched data based on flows that does not impede the processing of data by that switch.

SUMMARY OF THE INVENTION

The present invention is directed to a switch-on-chip solution for a switch, capable of using ethernet, fast ethernet, 1 gigabit and 10,000 Mbits/s ethernet systems, wherein all of the hardware is disposed on a single microchip. The present invention is also directed to methods employed to achieve the desired processing and forwarding of data, where the data is filtered based on flows.

The invention is therefore directed to a network switch for network communications, with the data switch including a first data port interface. The first data port interface supports at least one data port which transmit and receive data. A second data port interface is provided; the second data port interface supports at least one data port transmitting and receiving data at a second data rate. A CPU interface is provided, with the CPU interface configured to communicate with a CPU. An internal memory is provided, where the internal memory communicates with the first and second data port interfaces. A memory management unit is also provided, where the memory management unit includes an external memory interface for communicating data from at least one of the first and second data port interfaces and an external memory. A communication channel is provided, communicating data and messaging information between the first data port interface, the second data port interface, the CPU interface, the internal memory, and the memory management unit. One data port interface of the first and second data port interfaces includes a fast filtering processor, the fast filtering processor filtering the data coming into the one data port interface, and taking selective filter action based upon a filtering result. In addition, the one data port interface also has flow monitor for monitoring flows of data through the network switch, where a flow of the flows of data is defined by a combination of a source address and a destination address for a portion of the data passing through the network switch. The fast filtering processor is programmable by inputs from the CPU through the CPU interface.

The invention is also directed to a switch which includes a rules table interface, with the fast filtering processor applying a filter mask to an incoming packet, providing a filter result. The filter result is applied to predetermined rules in the rules table, and action is taken on the packet based upon the filtering result.

The invention is also directed to a method of handling data packets in a network switch, with the method including the step of placing incoming packets into an input queue, and applying the input data packets to an address resolution logic engine. A lookup is performed to determine whether certain packet fields are stored in a lookup table and index values for the input data packets are determined there from. The incoming packet is filtered through a fast filtering processor in order to determine what specific actions should be taken to modify the packet for further handling. The packet is discarded, forwarded, or modified based upon the filtering step. The index values are used by the fast filtering processor to rapidly find an indexed specific action of said specific actions.

The network switch can, in a preferred embodiment, be integrated on a single ASIC chip. The network switch can also, in a preferred embodiment, include a plurality of semiconductor-implemented lookup tables therein, said plurality of lookup tables including address resolution lookup/layer three lookup, rules tables, and VLAN tables.

BRIEF DESCRIPTION OF THE DRAWINGS

The objects and features of the invention will be more readily understood with reference to the following description and the attached drawings, wherein.

DETAILED DESCRIPTION OF THE PREFERRED EMBODIMENTS

In general, a flow is described by a five value identifier, including Source IP address, Destination IP address, Protocol type, Source Port and Destination Port (Src IP, Dest IP, Protocol type, Src Port, Dest Port). To identify a flow using the FFP requires the use of a Filter mask, which identifies the flow. The filter value along with the additional optional qualifiers, such as ingress port and egress port, form the search key, which is then used to search the Rules Table. If there is a match, then the associated actions are taken, which for instance could be to set the priority of the packet, drop the packet, etc. The general process of filtering incoming data is described in more detail below. It is noted that classification is one type of procedure that can be accomplished through the filtering process.

Typically, a large number of flows need to be monitored in a switch, especially switches that support Server load balancing type of applications. This would mean that the Rules Table would have to be large and search in such a large Rules Table would prohibit line rate performance. The present invention solves this deficiency by providing an index in the L2 and L3 tables and using indices obtained from the lookups to obtain a meter id and to perform associated actions.

Figure 1:
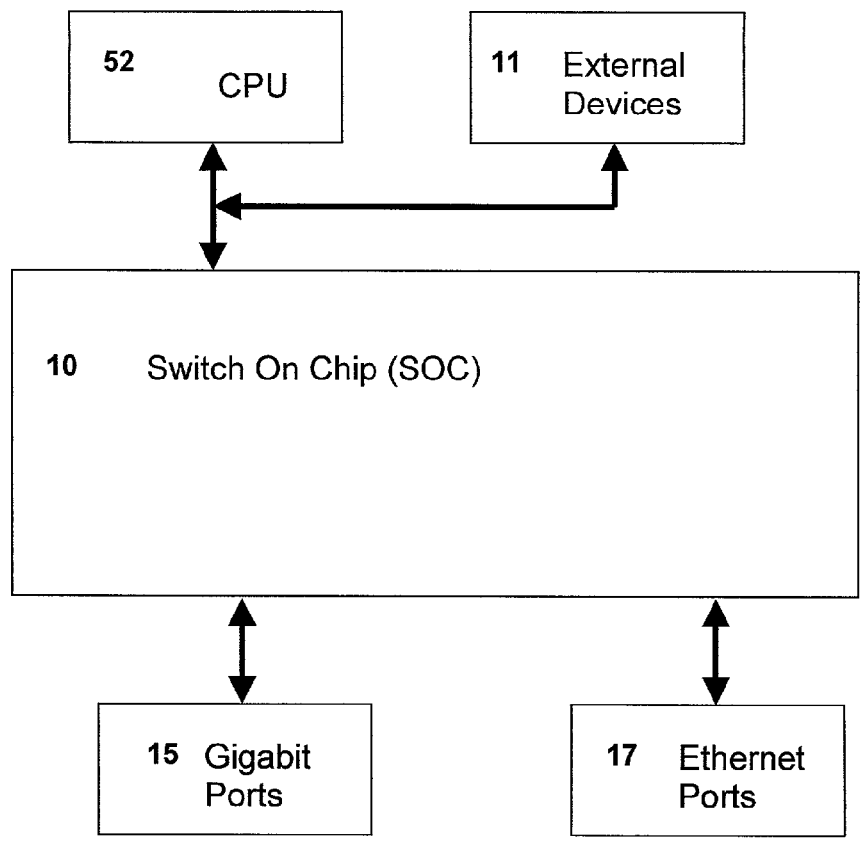
FIG. 1 is a general block diagram of elements of the present invention.

FIG. 1 illustrates a configuration wherein a switch-on-chip (SOC) 10, in accordance with the present invention, is functionally connected to external devices 11, a central processing unit (CPU) 52, gigabit ethernet ports 15, and ethernet ports 17. For the purposes of this embodiment, the gigabit ethernet ports 15, which are high speed ethernet ports, are capable of operating at 1000 Mbps, but are also capable of operating at speeds ranging from 10 Mbps to 100 Mbps. While the switch on chip is shown as being connected to ethernet ports as well, embodiments of this invention are applicable to switches that connect only to gigabit ethernet ports. External devices 11 could include other switching devices for expanding switching capabilities, or other devices as may be required by a particular application. CPU 52 can be used as necessary to program SOC 10 with rules which are appropriate to control packet processing. However, once SOC 10 is appropriately programmed or configured, SOC 10 operates, as much as possible, in a free running manner without communicating with CPU 52. Because CPU 52 does not control every aspect of the operation of SOC 10, CPU 52 performance requirements, at least with respect to SOC 10, are fairly low. A less powerful and therefore less expensive CPU 52 can therefore be used when compared to known network switches.

It should be noted that any number of gigabit ethernet ports 15 or ethernet ports 17 can be provided. In one embodiment, 8 gigabit ports 15 can be provided. Similarly, additional interconnect links to additional external devices 11 and CPUs 52 may be provided as necessary.

SOC 10 includes a plurality of Ethernet Port Interface Controllers (EPIC) 20a, 20b, 20c, etc., a plurality of Gigabit Port Interface Controllers (GPIC) 30a, 30b, etc., a CPU Management Interface Controller (CMIC) 40, a Common Buffer Memory Pool (CBP) 50, a Pipelined Memory Management Unit (PMMU) 70, including a Common Buffer Manager (CBM) 71, and a system-wide bus structure referred to as CPS channel 80. The PMMU 70 communicates with an external memory, which includes a Global Buffer Memory Pool (GBP) 60. The CPS channel 80 comprises a C channel, a P channel, and an S channel.

Figure 2:
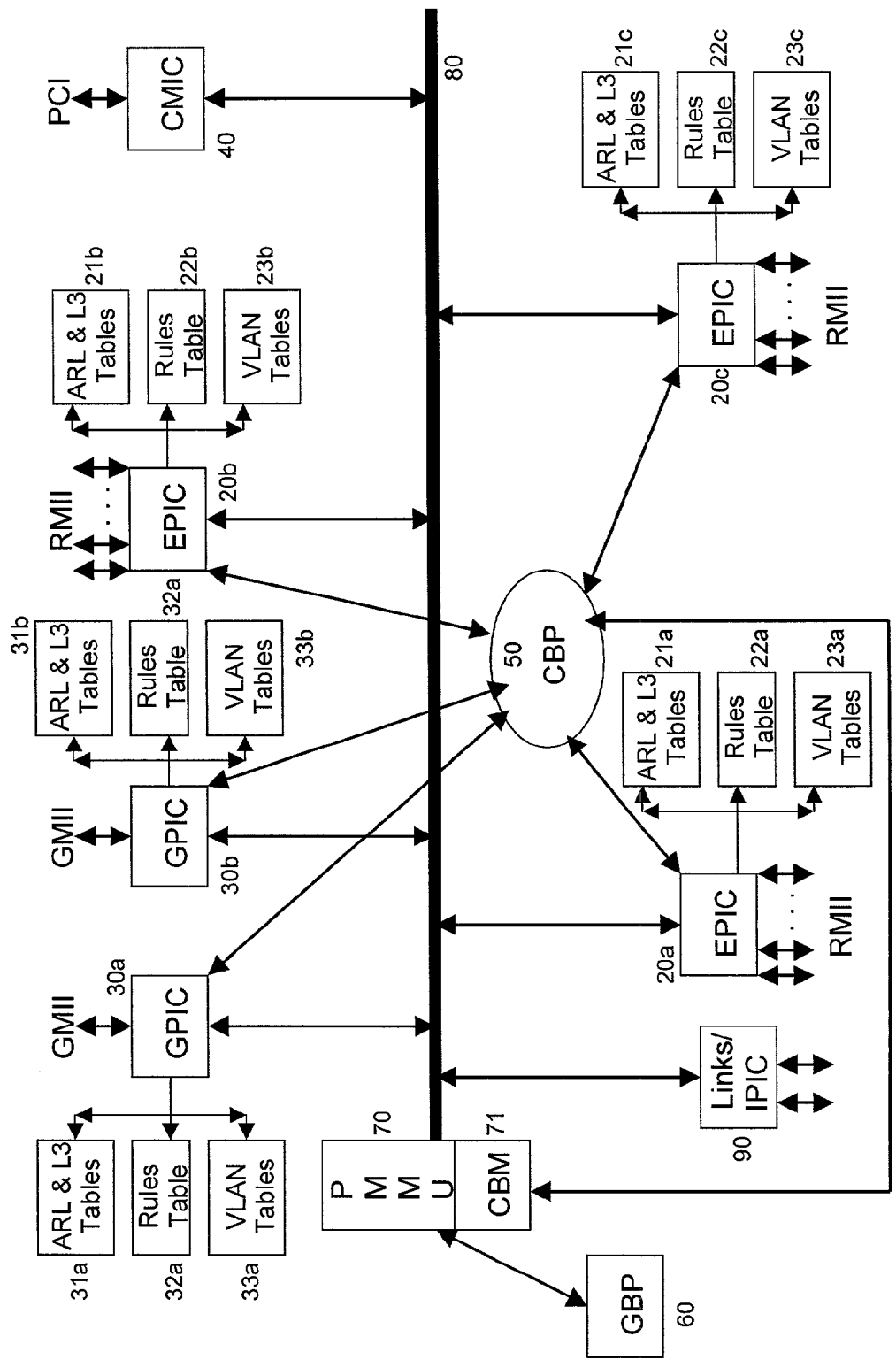
FIG. 2 is block diagram of elements of the switch on chip of the present invention.

The CPS channel is also referred to as the Cell Protocol Sideband Channel, and is a 17 Gbps channel which glues or interconnects the various modules together. As also illustrated in FIG. 2, other high speed interconnects can be provided, as shown as an extendible high speed interconnect. In one embodiment of the invention, this interconnect can be in the form of an interconnect port interface controller (IPIC) 90, which is capable of interfacing CPS channel 80 to external devices 11 through an extendible high speed interconnect link.

As will be discussed below, each EPIC 20a, 20b, and 20c, generally referred to as EPIC 20, and GPIC 30a and 30b, generally referred to as GPIC 30, are closely interrelated with appropriate address resolution logic and layer three switching tables 21a, 21b, 21c, 31a, 31b, rules tables 22a, 22b, 22c, 31a, 31b, and VLAN tables 23a 23b, 23c, 31a, 31b. These tables will be generally referred to as 21, 31, 22, 32, 23, 33, respectively. These tables, like other tables on SOC 10, are implemented in silicon as two-dimensional arrays.

In a preferred embodiment of the invention, each EPIC 20 supports 8 fast ethernet ports, and switches packets to and/or from these ports as may be appropriate. The ports, therefore, are connected to the network medium (coaxial, twisted pair, fiber, etc.) using known media connection technology, and communicates with the CPS channel 80 on the other side thereof. The interface of each EPIC 20 to the network medium can be provided through a Reduced Media Internal Interface (RMII), which enables the direct medium connection to SOC 10. As is known in the art, auto-negotiation is an aspect of fast ethernet, wherein the network is capable of negotiating a highest communication speed between a source and a destination based on the capabilities of the respective devices. The communication speed can vary, as noted previously, between 10 Mbps and 100 Mbps; auto negotiation capability, therefore, is built directly into each EPIC module.

The address resolution logic (ARL) and layer three tables (ARL/L3) 21a, 21b, 21c, rules table 22a, 22b, 22c, and VLAN tables 23a, 23b, and 23c are configured to be part of or interface with the associated EPIC in an efficient and expedient manner, also to support wirespeed packet flow.

Each EPIC 20 has separate ingress and egress functions. On the ingress side, self-initiated and CPU-initiated learning of level 2 address information can occur. Address resolution logic is utilized to assist in this task. Address aging is built in as a feature, in order to eliminate the storage of address information which is no longer valid or useful. The EPIC also carries out layer 2 mirroring. A fast filtering processor (FFP) 141 (see FIG. 3) is incorporated into the EPIC, in order to accelerate packet forwarding and enhance packet flow. The ingress side of each EPIC and GPIC has a significant amount of complexity to be able to properly process a significant number of different types of packets which may come in to the port, for linespeed buffering and then appropriate transfer to the egress. Functionally, each port on each module of SOC 10 has a separate ingress submodule associated therewith. From an implementation perspective, however, in order to minimize the amount of hardware implemented on the single-chip SOC 10, common hardware elements in the silicon will be used to implement a plurality of ingress submodules on each particular module. The configuration of SOC 10 discussed herein enables concurrent lookups and filtering, and therefore, processing of up to 6.6 million packets per second. Layer two lookups, Layers three lookups and filtering occur simultaneously to achieve this level of performance.

On the egress side, the EPIC is capable of supporting packet polling based either as an egress management or class of service (COS) function. Rerouting/scheduling of packets to be transmitted can occur, as well as head-of-line (HOL) blocking notification, packet aging, cell reassembly, and other functions associated with ethernet port interface.

Each GPIC 30 is similar to each EPIC 20, but supports only one gigabit ethernet port, and utilizes a port-specific ARL table, rather than utilizing an ARL table which is shared with any other ports. Additionally, instead of an RMII, each GPIC port interfaces to the network medium utilizing a gigabit media independent interface (GMII).

CMIC 40 acts as a gateway between the SOC 10 and the host CPU. The communication can be, for example, along a PCI bus, or other acceptable communications bus. CMIC 40 can provide sequential direct mapped accesses between the host CPU 52 and the SOC 10. CPU 52, through the CMIC 40, will be able to access numerous resources on SOC 10, including MIB counters, programmable registers, status and control registers, configuration registers, ARL tables, port-based VLAN tables, IEEE 802.1q VLAN tables, layer three tables, rules tables, CBP address and data memory, as well as GBP address and data memory. Optionally, the CMIC 40 can include DMA support, DMA chaining and scatter-gather, as well as master and target PCI64.

Common buffer memory pool or CBP 50 can be considered to be the on-chip data memory. In one embodiment of the invention, the CBP 50 is first level high speed SRAM memory, to maximize performance and minimize hardware overhead requirements. The CBP can have a size of, for example, 720 kilobytes running at 132 MHz. Packets stored in the CBP 50 are typically stored as cells, rather than packets. As illustrated in the figure, PMMU 70 also contains the Common Buffer Manager (CBM) 71 thereupon. CBM 71 handles queue management, and is responsible for assigning cell pointers to incoming cells, as well as assigning common packet IDs (CPID) once the packet is fully written into the CBP. CBM 71 can also handle management of the on-chip free address pointer pool, control actual data transfers to and from the data pool, and provide memory budget management.

Global memory buffer pool or GBP 60 acts as a second level memory, and can be located on-chip or off chip. In the preferred embodiment, GBP 60 is located off chip with respect to SOC 10. When located off-chip, GBP 60 is considered to be a part of or all of the external memory. As a second level memory, the GBP does not need to be expensive high speed SRAMs, and can be a slower less expensive memory such as DRAM. The GBP is tightly coupled to the PMMU 70, and operates like the CBP in that packets are stored as cells. For broadcast and multicast messages, only one copy of the packet is stored in GBP 60.

As shown in the figure, PMMU 70 is located between GBP 60 and CPS channel 80, and acts as an external memory interface. In order to optimize memory utilization, PMMU 70 includes multiple read and write buffers, and supports numerous functions including global queue management, which broadly includes assignment of cell pointers for rerouted incoming packets, maintenance of the global FAP, time-optimized cell management, global memory budget management, GPID assignment and egress manager notification, write buffer management, read prefetches based upon egress manager/class of service requests, and smart memory control.

Figure 3:
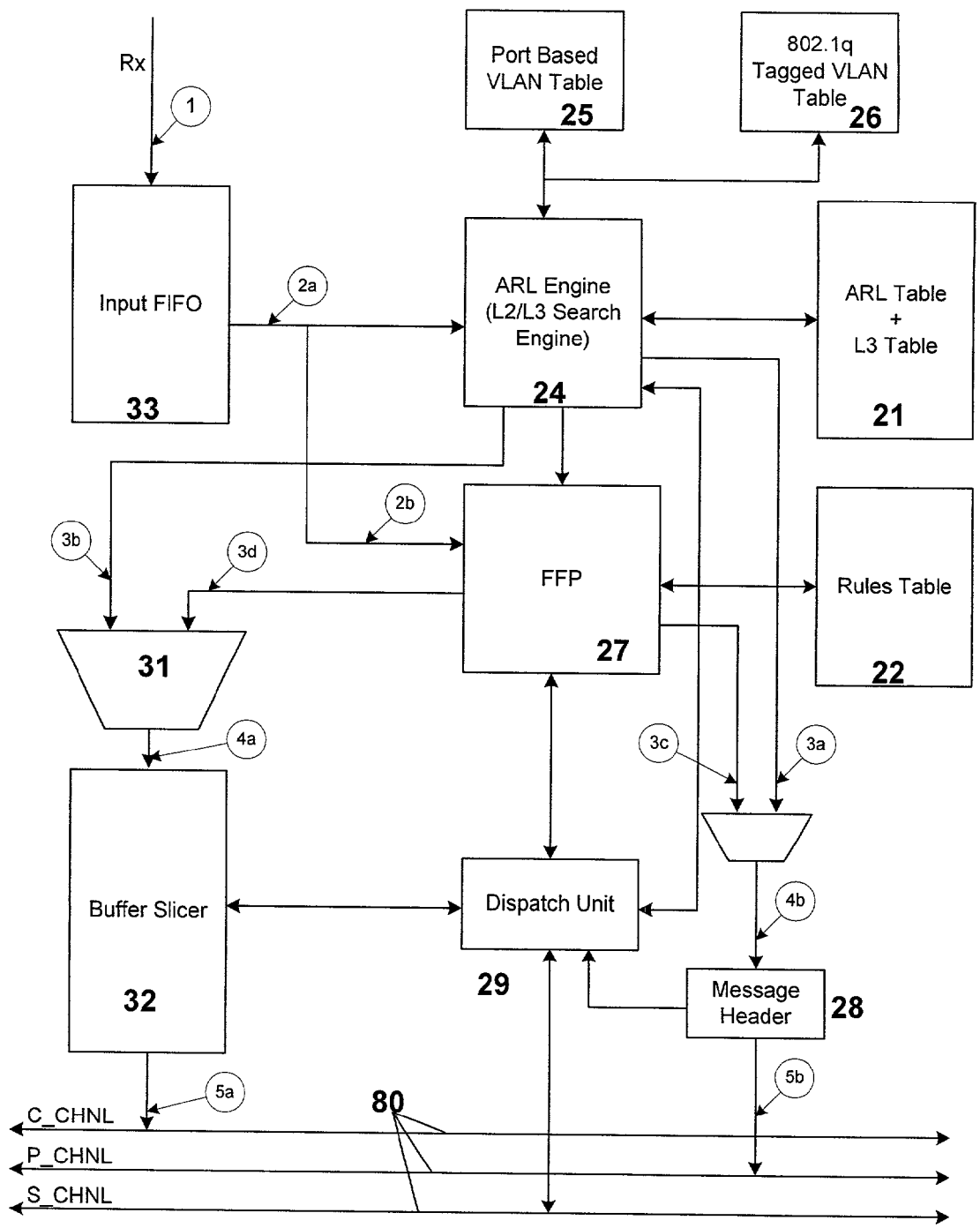
FIG. 3 illustrates data flow in ingress in the switch of the present invention.

FIG. 3 illustrates some of the concurrent filtering and look-up details of a packet coming into the ingress side of a port of the switch. FIG. 3 addresses the application of filtering, address resolution, and rules application segments of SOC 10. These functions are performed simultaneously with respect to the CBP admission discussed above. As shown in the figure, packet is received at an input port of one of the EPIC 20 or GPIC 30. It is then directed to input FIFO 33. As soon as the first sixteen bytes of the packet arrive in the input FIFO 33, an address resolution request is sent to ARL engine 24 (step 2*a*); this initiates lookup in ARL/L3 tables 21.

If the packet has 802.1q Tag then the ARL Engine does the lookup based on 802.1q Tag in the TAG BASED VLAN TABLE. If the packet does not contain 802.1q Tag then ARL Engine gets the VLAN based on the ingress port from the PORT BASED VLAN TABLE. Once the VLAN is identified for the incoming packet, ARL Engine does the ARL Table search based on Source Mac Address and Destination Mac Address. The key used in this search is Mac Address+VLAN Id. If the result of the ARL search is one of the L3 Interface Mac Address, then it does the L3 search to get the Route Entry. If an L3 search is successful then it modifies the packet as per Packet Routing Rules.

At step 2*b*, a Filtering Request is sent to Fast Filtering Processor (FFP) 27 as soon as first 64 bytes arrive in the Input FIFO. The outcome of the ARL search, step 3*a*, is the egress port/ports, the Class Of Service (COS), Untagged Port Bitmap and also in step 3*b* the modified packet in terms of Tag Header, or L3 header and L2 Header as per Routing Rules. The FFP applies all the configured Filters and results are obtained from the RULES TABLE.

The outcome of the Filtering Logic, at 3*c*, decides if the packet has to be discarded, sent to the CPU or, in 3*d*, the packet has to be modified in terms of 802.1q header or the TOS Precedence field in the IP Header. If the TOS Precedence field is modified in the IP Header then the IP Checksum needs to be recalculated and modified in the IP Header.

The outcome of FFP and ARL Engine, 31, in 4*a*, are applied to modify the packet in the Buffer Slicer 32. Based on the outcome of ARL Engine and FFP, 4*b*, the Message Header 28 is formed ready to go on the Protocol Channel 30. The Dispatch Unit 29 sends the modified packet over the cell Channel 80, in 5*a*, and at the same time, in 5*b*, sends the control Message on the Protocol Channel 80. The Control Message contains the information such as source port number, COS, Flags, Time Stamp and the bitmap of all the ports on which the packet should go out and Untagged Bitmap.

FFP 27 is essentially a state machine driven programmable rules engine. The filters used by the FFP are 64 (sixty-four) bytes wide, and are applied on an incoming packet; any offset can be used, however, a preferred embodiment uses an offset of zero, and therefore operates on the first 64 bytes, or 512 bits, of a packet. The actions taken by the filter are tag insertion, priority mapping, TOS tag insertion, sending of the packet to the CPU, dropping of the packet, forwarding of the packet to an egress port, and sending the packet to a mirrored port.

The filters utilized by FFP 141 are defined by rules table 22. Rules table 22 is completely programmable by CPU 52, through CMIC 40. The rules table can be, for example, 256 entries deep, and may be partitioned for inclusive and exclusive filters, with, again as an example, 128 entries for inclusive filters and 128 entries for exclusive filters. A filter database, within FFP 141, includes a number of inclusive mask registers and exclusive mask registers, such that the filters are formed based upon the rules in rules table 22, and the filters therefore essentially form a 64 byte wide mask or bit map which is applied on the incoming packet.

If the filter is designated as an exclusive filter, the filter will exclude all packets unless there is a match. In other words, the exclusive filter allows a packet to go through the forwarding process only if there is a filter match. If there is no filter match, the packet is dropped. In an inclusive filter, if there is no match, no action is taken but the packet is not dropped. Action on an exclusive filter requires an exact match of all filter fields. If there is an exact match with an exclusive filter, therefore, action is taken as specified in the action field; the actions which may be taken, are discussed above. If there is no full match or exact of all of the filter fields, but there is a partial match, then the packet is dropped. A partial match is defined as either a match on the ingress field, egress field, or filter select fields. If there is neither a full match nor a partial match with the packet and the exclusive filter, then no action is taken and the packet proceeds through the forwarding process. The FFP configuration, taking action based upon the first 64 bytes of a packet, enhances the handling of real time traffic since packets can be filtered and action can be taken on the fly. Without an FFP according to the invention, the packet would need to be transferred to the CPU for appropriate action to be interpreted and taken. For inclusive filters, if there is a filter match, action is taken, and if there is no filter match, no action is taken; however, packets are not dropped based on a match or no match situation for inclusive filters.

In summary, the FFP includes a filter database with eight sets of inclusive filters and eight sets of exclusive filters, as separate filter masks. As a packet comes into the FFP, the filter masks are applied to the packet; in other words, a logical AND operation is performed with the mask and the packet. If there is a match, the matching entries are applied to rules tables 22, in order to determine which specific actions will be taken. As mentioned previously, the actions include 802.1p tag insertion, 802.1p priority mapping, IP TOS (type-of-service) tag insertion, sending of the packet to the CPU, discarding or dropping of the packet, forwarding the packet to an egress port, and sending the packet to the mirrored port.

Since there are a limited number of fields in the rules table, and since particular rules must be applied for various types of packets, the rules table requirements are minimized in the present invention by the present invention setting all incoming packets to be "tagged" packets; all untagged packets, therefore, are subject to 802.1p tag insertion, in order to reduce the number of entries which are necessary in the rules table. This action eliminates the need for entries regarding handling of untagged packets. It should be noted that specific packet types are defined by various IEEE and other networking standards, and will not be defined herein.

Figure 4:
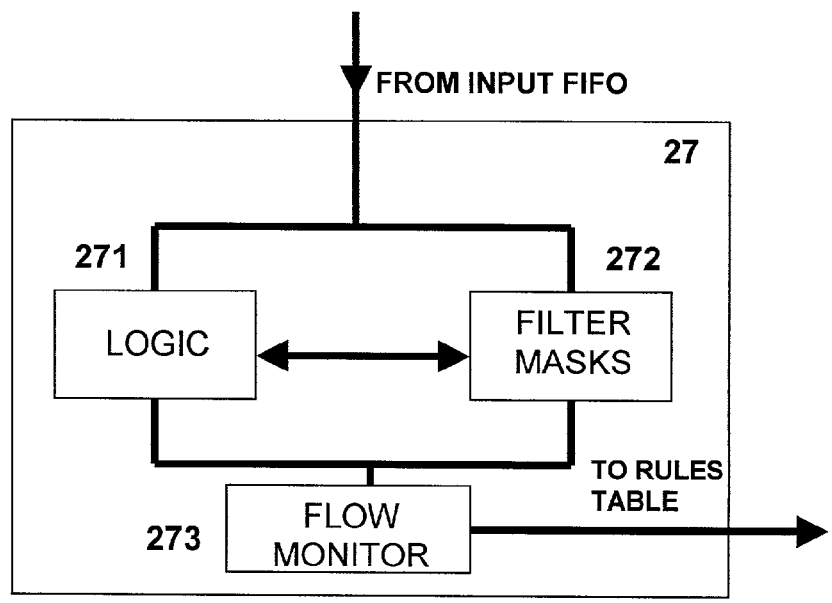
FIG. 4 is a block diagram of a fast filtering processor (FFP)

As noted previously, exclusive filters are defined in the rules table as filters which exclude packets for which there is no match; excluded packets are dropped. With inclusive filters, however, packets are not dropped in any circumstances. If there is a match, action is taken as discussed above; if there is no match, no action is taken and the packet proceeds through the forwarding process. Referring to FIG. 4, FFP 27 is shown to include filter database 272 containing filter masks therein, communicating with logic circuitry 271 for determining packet types and applying appropriate filter masks. When the packets are filtered based on flows, as discussed below, a flow monitor 273, is used to track the flows through the switch. After the filter mask is applied as noted above, the result of the application is applied to rules table 22, for appropriate lookup and action. It should be noted that the filter masks, rules tables, and logic, while programmable by CPU 52, do not rely upon CPU 52 for the processing and calculation thereof. After programming, a hardware configuration is provided which enables linespeed filter application and lookup.

Referring once again to FIG. 3, after FFP 27 applies appropriate configured filters and results are obtained from the appropriate rules table 22, logic 271 in FFP 27 determines and takes the appropriate action. The filtering logic can discard the packet, send the packet to the CPU 52, modify the packet header or IP header, and recalculate any IP checksum fields or takes other appropriate action with respect to the headers. The modification occurs at buffer slicer 32, and the packet is placed on C channel 80. The control message and message header information is applied by the FFP 27 and ARL engine 24, and the message header is placed on P channel 80. Dispatch unit 29 coordinates all dispatches to C channel, P channel and S channel.

As noted previously, each EPIC module 20, GPIC module 30, PMMU 70, etc. are individually configured to communicate via the CPS channel. Each module can be independently modified, and as long as the CPS channel interfaces are maintained, internal modifications to any modules such as EPIC 20*a* should not affect any other modules such as EPIC 20*b*, or any GPICs 30.

Figure 5:
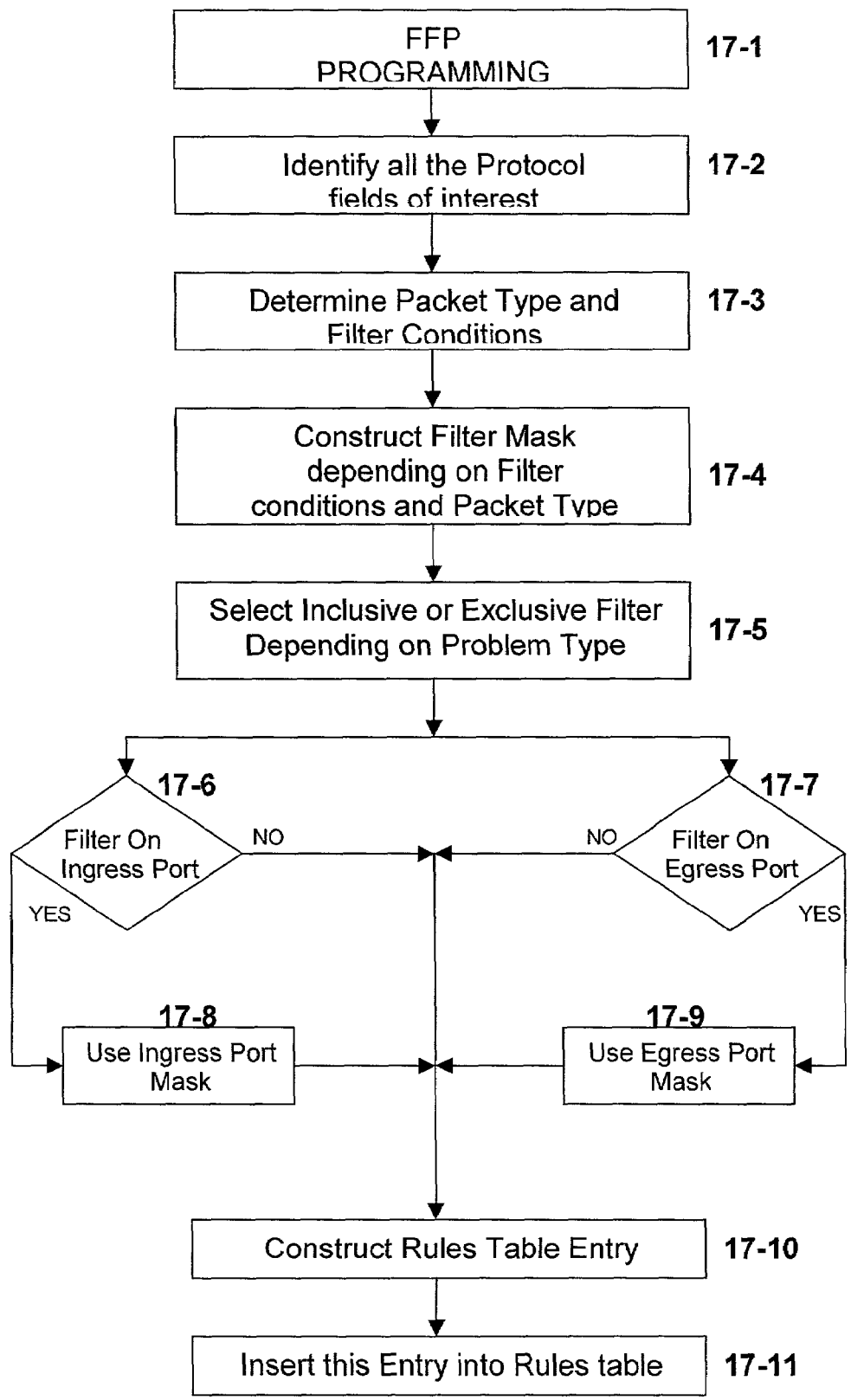
FIG. 5 illustrates a series of steps which are used to program an FFP.

As mentioned previously, FFP 27 is programmed by the user, through CPU 52, based upon the specific functions which are sought to be handled by each FFP 27. Referring to FIG. 5, it can be seen that in step 17-1, an FFP programming step is initiated by the user. Once programming has been initiated, the user identifies the protocol fields of the packet which are to be of interest for the filter, in step 17-2. In step 17-3, the packet type and filter conditions are determined, and in step 17-4, a filter mask is constructed based upon the identified packet type, and the desired filter conditions. The filter mask is essentially a bit map which is applied or ANDed with selected fields of the packet. After the filter mask is constructed, it is then determined whether the filter will be an inclusive or exclusive filter, depending upon the problems which are sought to be solved, the packets which are sought to be forwarded, actions sought to be taken, etc. In step 17-6, it is determined whether or not the filter is on the ingress port, and in step 17-7, it is determined whether or not the filter is on the egress port. If the filter is on the ingress port, an ingress port mask is used in step 17-8. If it is determined that the filter will be on the egress port, then an egress mask is used in step 17-9. Based upon these steps, a rules table entry for rules tables 22 is then constructed, and the entry or entries are placed into the appropriate rules table (steps 17-10 and 17-11). These steps are taken through the user inputting particular sets of rules and information into CPU 52 by an appropriate input device, and CPU 52 taking the appropriate action with respect to creating the filters, through CMIC 40 and the appropriate ingress or egress submodules on an appropriate EPIC module 20 or GPIC module 30.

The present invention addresses the problem that occurs when tracking a large number of flows. By using the ARL tables (L2 and L3 Tables) more efficiently, the line rate performance of the switch does not have to be sacrificed. An index is stored in the address L2 and L3 Tables as shown below. The index is derived from a set of free index pool.

TABLE 1

| VLAN ID | MAC Address | Port Number | ... | Index A |
|---------|-------------|-------------|-----|---------|

TABLE 2

| IP Address | Next hop MAC Address | Port Number | ... | Index B |
|------------|----------------------|-------------|-----|---------|

When a packet arrives, the L2 tables and L3 tables are searched for both source and destination addresses. An index is stored with each address in L2 table and L3 table as shown above. This index is then used in the search of an Indexed Rules Table to speed up the process.

For example, assume that a flow is defined as a combination of Source IP and Destination IP address. A source lookup of the IP address is performed during which the index is obtained. A destination lookup of the IP address is performed during which the index j is obtained. Then using the ij as an index, the Indexed Rules Table is accessed to obtain a meter id. Logic is then performed to determine if the flow is in-profile or out-profile and the associated actions are taken as described above.

TABLE 3

| Meter id | In-Profile Actions | Out-Profile Actions | Other Relevant Fields |
|----------|--------------------|--------------------|-----------------------|

The above configuration allows for a larger number of flows to be tracked without increasing the size of the Rules Table. This also allows the FFP to filter on addresses that are not found in the Address Tables. The present invention provides a simple mechanism to track flows using the address tables and provides the advantage of tracking larger number of flows without sacrificing line rate performance.

The above-discussed configuration of the invention is, in a preferred embodiment, embodied on a semiconductor substrate, such as silicon, with appropriate semiconductor manufacturing techniques and based upon a circuit layout which would, based upon the embodiments discussed above, be apparent to those skilled in the art. A person of skill in the art with respect to semiconductor design and manufacturing would be able to implement the various modules, interfaces, and tables, buffers, etc. of the present invention onto a single semiconductor substrate, based upon the architectural description discussed above. It would also be within the scope of the invention to implement the disclosed elements of the invention in discrete electronic components, thereby taking advantage of the functional aspects of the invention without maximizing the advantages through the use of a single semiconductor substrate.

Although the invention has been described based upon these preferred embodiments, it would be apparent to those of skilled in the art that certain modifications, variations, and alternative constructions would be apparent, while remaining within the spirit and scope of the invention. In order to determine the metes and bounds of the invention, therefore, reference should be made to the appended claims.

What is claimed is:

1. A network switch for network communications, said network switch comprising:

a first data port interface, said first data port interface supporting a plurality of data ports transmitting and receiving data at a first data rate;

a second data port interface, said second data port interface supporting a plurality of data ports transmitting and receiving data at a second data rate;

a CPU interface, said CPU interface configured to communicate with a CPU;

an internal memory, said internal memory communicating with said first data port interface and said second data port interface;

a memory management unit, said memory management unit including an external memory interface for communicating data from at least one of said first data port interface and said second data port interface and an external memory;

a communication channel, communicating data and messaging information between said first data port interface, said second data port interface, the CPU interface, said internal memory, and said memory management unit;

wherein one data port interface of said first data port interface and said second data port interface comprises a fast filtering processor, said fast filtering processor filtering the data coming into the one data port interface, and taking selective filter action based upon a filtering result, and wherein said one data port interface further comprises a flow monitor for monitoring flows of data through the network switch, where a flow of said flows of data is defined by a combination of a source address and a destination address for a portion of the data passing through the network switch, and wherein monitoring flows of data comprises associating a particular packet with a previously identified flow if the particular packet has both the source address and the destination address of the previously identified flow.

2. A network switch as recited in claim 1, wherein said fast filtering processor is programmable by inputs from the CPU through the CPU interface.

3. A network switch as recited in claim 1, wherein said one data port interface includes a rules table interface and an indexed rules table thereupon, and wherein said fast filtering processor applies a filter mask to a packet incoming thereto, providing a filter result, wherein said filter result is applied to predetermined rules in said indexed rules table, and wherein action is taken on the packet and said flows of data are updated based upon the filtering result.

4. A network switch as recited in claim 3, wherein said first data port interface, second data port interface, CPU interface, internal memory, memory management unit, communications channel, fast filtering processor, and said rules table are implemented on a common semiconductor substrate.

5. A network switch as recited in claim 4, wherein said fast filtering processor includes a set of exclusive filter masks and inclusive filter masks therein, wherein said exclusive filter masks are configured to exclude all packets except packets with which there is a match with the filter result.

6. A network switch as recited in claim 4, wherein said fast filtering processor includes filter masks which filter ingress port fields, egress port fields, and filter select fields of an incoming packet.

7. A network switch as recited in claim 6, wherein the indexed rules table includes filter value fields for filter result look-up, ingress port fields, egress port fields, filter select fields, action bit fields, priority bit fields, type-of-services fields, and output port fields.

8. A network switch as recited in claim 7, wherein the indexed rules table is indexed by values obtained from lookups of the source and destination addresses for the incoming packet.

9. A network switch as recited in claim 1, wherein the fast filtering processor filters the packets independent of the CPU interface, and therefore without communicating with the CPU.

10. A method of handling data packets in a network switch, said method comprising:
  placing incoming packets into an input queue;
  applying the input data packets to an address resolution logic engine;
  performing a lookup to determine whether certain packet fields are stored in a lookup table and determining index values for the input data packets;
  filtering the incoming packet through a fast filtering processor in order to determine what specific actions should be taken to modify the packet for further handling; and
  discarding, forwarding, or modifying the packet based upon the filtering;
  wherein said index values are used by the fast filtering processor to rapidly find an indexed specific action of said specific actions,
  wherein said index values are used by the fast filtering processor to associate a particular packet with a previously identified flow if the particular packet has both the source address and the destination address of the previously identified flow.

11. A method as recited in claim 10, wherein said step of determining index values for the input data packets is based upon lookups of a source address and a destination address for the input data packet.

12. A method as recited in claim 11, wherein said source and destination addresses for the input data packet are related to a flow and said filtering step further comprises monitoring flows of data through the network switch.

13. A network switch for handling data packets comprising:
  means for placing incoming packets into an input queue;
  means for applying the input data packets to an address resolution logic engine;
  means performing a lookup to determine whether certain packet fields are stored in a lookup table and means for determining index values for the input data packets;
  means for filtering the incoming packet through a fast filtering processor in order to determine what specific actions should be taken to modify the packet for further handling; and
  means for discarding, forwarding, or modifying the packet based upon the filtering;
  wherein said index values are used by the fast filtering processor to rapidly find an indexed specific action of said specific actions,
  wherein said index values are used by the fast filtering processor to associate a particular packet with a previously identified flow if the particular packet has both the source address and the destination address of the previously identified flow.

14. A network switch as recited in claim 13, wherein said means for determining index values for the input data packets comprises means for performing lookups of a source address and a destination address for the input data packet.

15. A network switch as recited in claim 13, wherein said source and destination addresses for the input data packet are related to a flow and said means for filtering further comprises means for monitoring flows of data through the network switch.

* * * * *